US009501327B2

(12) United States Patent
Brown et al.

(10) Patent No.: US 9,501,327 B2
(45) Date of Patent: Nov. 22, 2016

(54) CONCURRENTLY PROCESSING PARTS OF CELLS OF A DATA STRUCTURE WITH MULTIPLE PROCESSES

(71) Applicant: International Business Machines Corporation, Armonk, NY (US)

(72) Inventors: Theresa M. Brown, Tucson, AZ (US); Nicolas M. Clayton, Warrington (GB); Lokesh M. Gupta, Tucson, AZ (US); Theodore T. Harris, Jr., Tucson, AZ (US); Brian D. Hatfield, Tucson, AZ (US); Matthew Sanchez, Tucson, AZ (US); David B. Schreiber, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 217 days.

(21) Appl. No.: 14/277,019

(22) Filed: May 13, 2014

(65) Prior Publication Data

US 2015/0331712 A1    Nov. 19, 2015

(51) Int. Cl.
*G06F 9/48* (2006.01)
*G06F 9/50* (2006.01)
*G06F 17/30* (2006.01)

(52) U.S. Cl.
CPC .......... *G06F 9/5066* (2013.01); *G06F 9/4843* (2013.01); *G06F 17/30943* (2013.01)

(58) Field of Classification Search
None
See application file for complete search history.

(56) References Cited

U.S. PATENT DOCUMENTS

| 5,197,137 A * | 3/1993 | Kumar | G06F 8/45 712/42 |
| 6,445,398 B1 * | 9/2002 | Gerba | G06F 3/04815 348/E5.105 |
| 6,792,421 B2 * | 9/2004 | Wyse | G06F 17/3087 |
| 6,957,210 B1 | 10/2005 | Ramesh | |
| 7,987,464 B2 * | 7/2011 | Day | G06F 9/5077 710/260 |
| 8,271,989 B2 * | 9/2012 | Anand | G06F 9/5027 718/1 |
| 9,146,777 B2 * | 9/2015 | niguez | G06F 9/4843 |
| 2004/0181501 A1 | 9/2004 | Burdick et al. | |
| 2007/0256076 A1 * | 11/2007 | Thompson | G06F 9/5066 718/102 |

OTHER PUBLICATIONS

SPI DST et al., "Program Partitioning and Synchronization on Multiprocessor Systems", dated Apr. 22, 2007, An IP.com Prior Art Database Technical Disclosure No. IPCOM000151496D, Total 170 pages.

* cited by examiner

*Primary Examiner* — Van Nguyen
(74) *Attorney, Agent, or Firm* — David W. Victor; Konrad Raynes Davda & Victor LLP

(57) ABSTRACT

Provided are a computer program product, system, and method for concurrently processing parts of cells of a data structure with multiple processes. Information is provided to indicate a partitioning of the cells of the data structure into a plurality of parts, and having a cursor pointing to a cell in the part. Processes concurrently process different parts of the data structure by performing: determining from the cursor for the part one of the cells in the part to process; processing the cells from the cursor to determine whether to process the unit of work corresponding to the cell; and setting the cursor to identify one of the cells from which processing is to continue in a subsequent iteration in response to processing the units of work for a plurality of the processed cells.

20 Claims, 6 Drawing Sheets

Part Information Instance

CONCURRENTLY PROCESSING PARTS OF CELLS OF A DATA STRUCTURE WITH MULTIPLE PROCESSES

BACKGROUND OF THE INVENTION

1. Field of the Invention

The present invention relates to a computer program product, system, and method for concurrently processing parts of cells of a data structure with multiple processes.

2. Description of the Related Art

A bitmap data structure may be used in different computing environments to indicate whether work needs to be performed corresponding to cells or bits in the bitmap set to a certain value. A process may scan the bitmap for a fixed number of bits indicating work to perform, such as set to one, and indicates the work to perform for the located bits on a list so that the work indicated on the list may be later performed. Multiple lists may be crated with fixed number of items of work to perform for each time the process scans the bitmap for cells indicating work to perform. Delays and latency may result from the time required to access the bitmap which may be stored in a slower access storage device requiring the bitmap to be retrieved from the slower access disk and cached, and then the time required to scan the bitmap for entries indicating items of work to perform. If a set bit is found, the work is performed, and the data structure is processed to look for a next set bit until a fixed number of set bits indicating work to perform is processed.

One common use of a bitmap is in data copy or data movement operations. A copy manager program may initialize a bitmap where each cell in the bitmap corresponds to a track or data unit to transfer from a source location to a target location. Once the track is copied, the cell corresponding to the copied track is set to zero to indicate that copying of the track has completed. A bitmap may also be used by a Snapshot or FlashCopy® process, where the cells of the bitmap indicate whether corresponding tracks have been updated, such that the updates need to be mirrored to a remote location. (FlashCopy is a registered trademark of International Business Machines Corporation in the United States and other countries).

There is a need in the art for improved techniques for processing bits or cells in a data structure, such as a bitmap data structure.

SUMMARY

Provided are a computer program product, system, and method for concurrently processing parts of cells of a data structure with multiple processes. Information is provided to indicate a partitioning of the cells of the data structure into a plurality of parts, and having a cursor pointing to a cell in the part. Processes concurrently process different parts of the data structure by performing: determining from the cursor for the part one of the cells in the part to process; processing the cells from the cursor to determine whether to process the unit of work corresponding to the cell; and setting the cursor to identify one of the cells from which processing is to continue in a subsequent iteration in response to processing the units of work for a plurality of the processed cells.

DETAILED DESCRIPTION

Described embodiments provide techniques for defining parts or partitions of a bitmap data structure, where each part is considered as having consecutive cells, and each cell represents a unit of work to perform. Multiple processes may concurrently process cells in different parts of the data structure to allow parallel processing of the data structure to allow parallel processing of the units of work represented by the cells in the different parts or partitions of the data structure.

Figure 1:
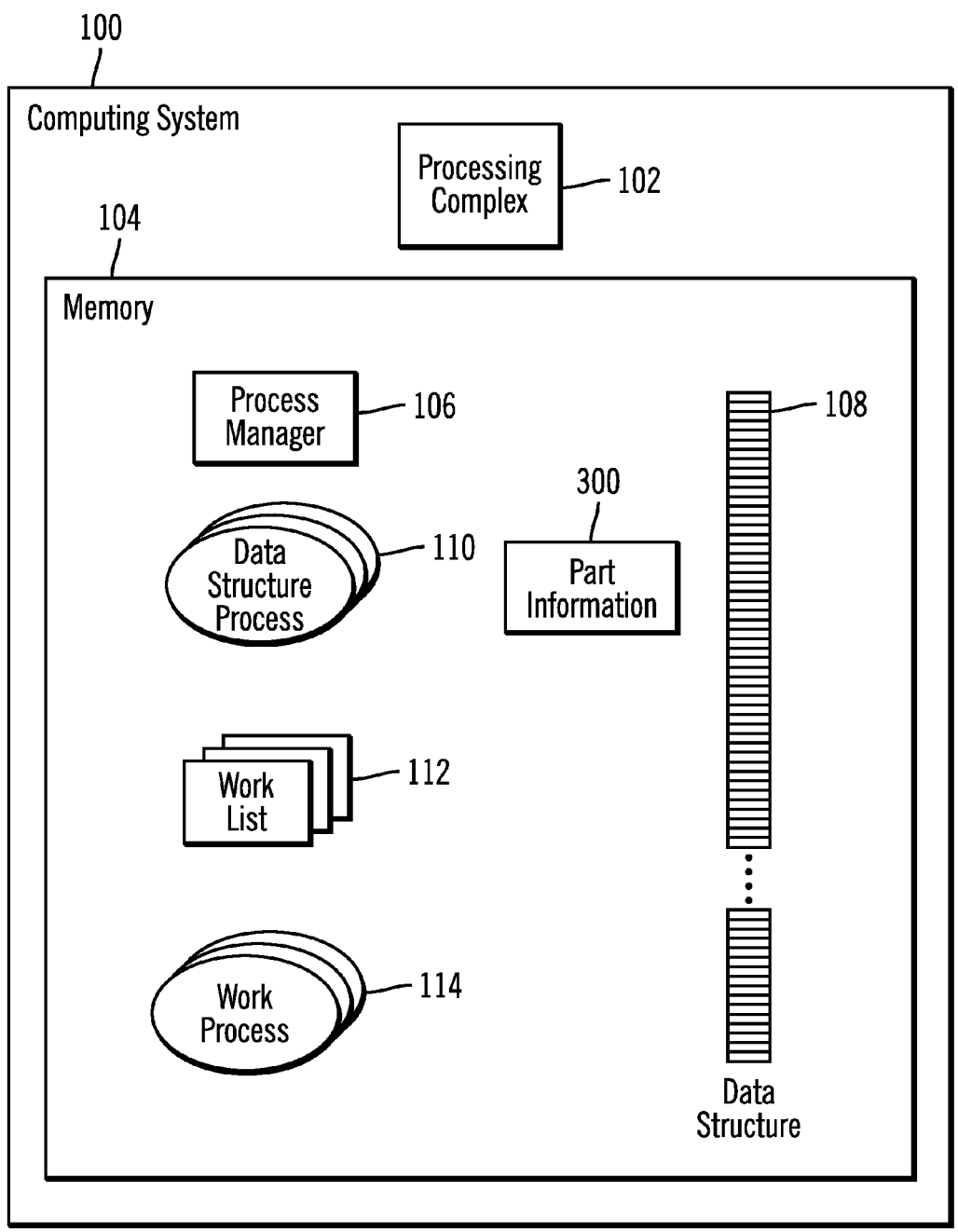
FIG. 1 illustrates an embodiment of a computing environment in which a data structure having cells representing units of work is processed.

FIG. 1 illustrates an embodiment of a computing environment for processing a data structure having cells representing units of work to perform, including a computing system 100 having a processor complex 102, comprising one or more microprocessor units, and a memory 104, comprising volatile and non-volatile storage devices. The memory 104 includes programs executed by the processor complex, including a process manager 106 to initialize a data structure 108 to process and data structure processes 110 to process the data structure 108 to determine units of work to perform or execute.

In one embodiment, the data structure processes 110 may add the units of work they locate from the data structure 108 onto a work list 112. Multiple work lists 112 may be generated when each of the concurrently and independently executing data structure processes 110 determine units of work to process. One or more separate work processes 114 may access the work lists 112 to process or perform the units of work on the work lists 112. When a work process 114 processes a unit of work from one of the work lists 112, the cell in the data structure 108 corresponding to that unit of work may be set to indicate that the unit of work has been performed. In an alternative embodiment, the processes 110 may execute the unit of work when processing the cell in the bitmap corresponding to the unit of work without placing the units of work on the work list 112.

The process manager 106, data structure processes 110, and work processes 114 may be implemented as computer readable program instructions in a non-volatile or volatile storage that are executed by a processor or in an application specific integrated circuit (ASIC) or combination thereof.

The data structure processes 110 may view the data structure 108 cells as being partitioned into a series of consecutive parts, where each part is comprised of consecutive cells, such that different data structure processes 110 may concurrently process the cells of different recognized parts in the data structure 108 to allow concurrent processing of the cells in the data structure 108, which allows the concurrent execution of units of work corresponding to the processed cells. The process manager 106 may initialize part information 300 having information on each defined part in the data structure 108. The data structure processes 110 use this part information 300 to concurrently process cells in different parts of the data structure 108. In this way, the data structure 108 itself may not indicate different parts to process, but the parts may be defined according to the part information 300 and logic executed by the data structure processes 110.

Figure 2:
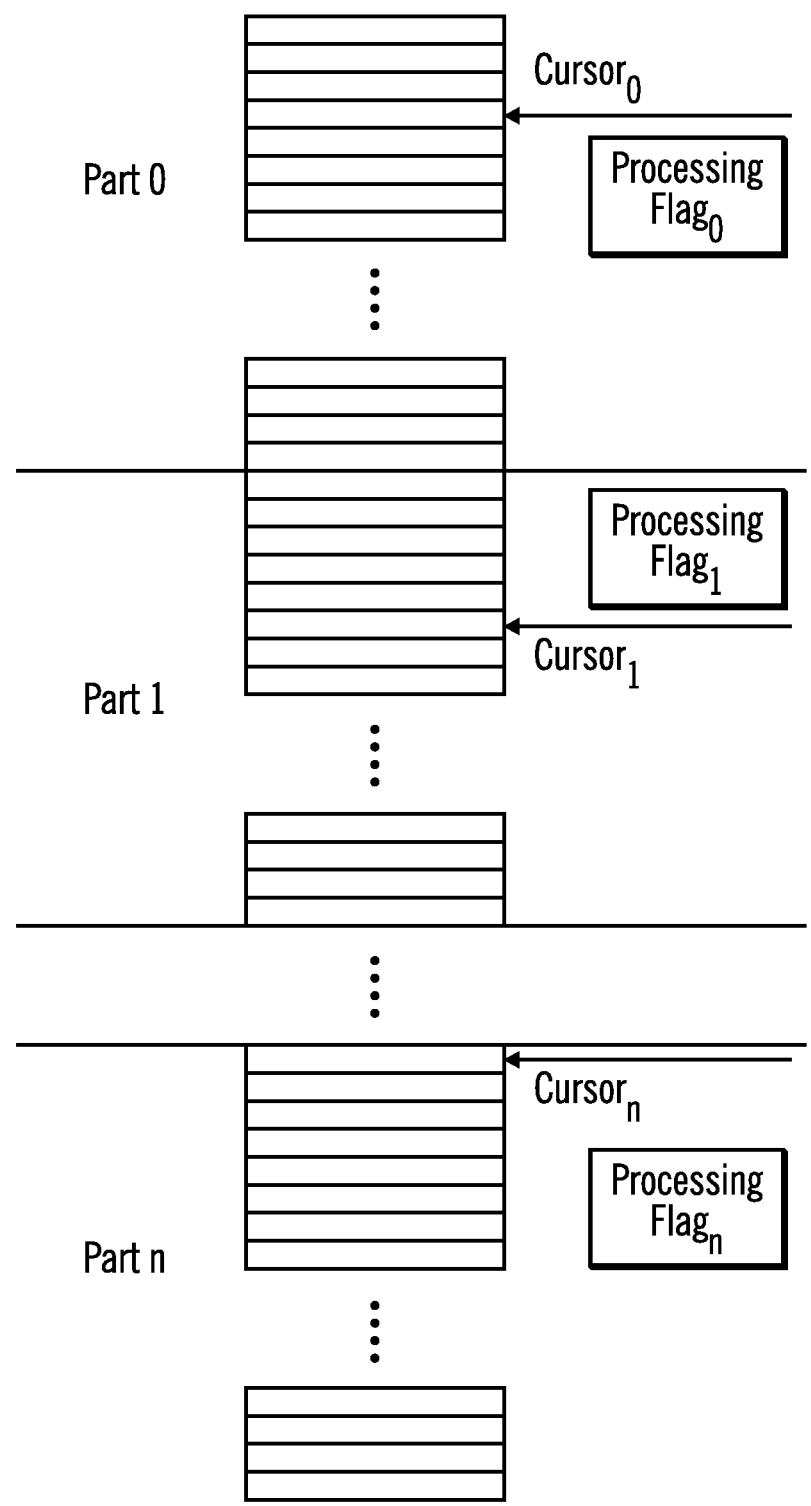
FIG. 2 illustrates an embodiment of how the data structure may be partitioned into parts.

FIG. 2 illustrates an example of how parts may be defined in the data structure 108, including a plurality of parts 0, 1 . . . n of consecutive cells, where the cells are represented by the rectangular boxes. Each part 0, 1 . . . n may have an equal number of cells. In alternative embodiments different defined parts of the data structure 108 may have different numbers of cells. FIG. 2 further shows the cursors 0, 1 . . . n pointing to cells at which processing is to be performed in the part 0, 1 . . . n, where the cursor n for part n points to the first cell in part n, indicating that part n has not yet been processed.

Figure 3:
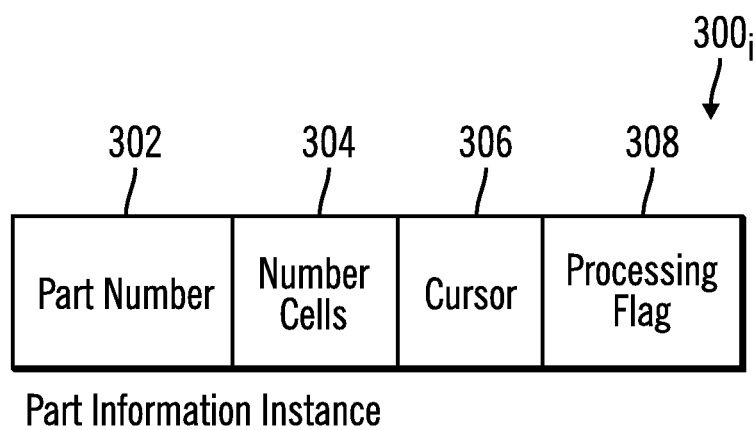
FIG. 3 illustrates an embodiment of part information defining the parts of the data structure.

FIG. 3 illustrates an embodiment of an instance of part information $300_i$, for one of the parts of the data structure 108, including a part number 302, where the parts may be numbered in sequential ordering; a number of cells 304 in the part, wherein each part may have a same number of cells; a cursor 306 pointing to a cell of the part 302 at which to start processing; and a processing flag 308 indicating whether the part 302 is currently being processed or not being processed.

The cursor 306 may be initially set to the first cell in the part 302. After a process 110 processes a plurality of cells in the part to add to the work lists 112, such as a predetermined number of units of work, the process 110 may move the cursor 306 to point to the beginning of the next cell of the part 302 to be processed during a subsequent iteration of the processing of the part 302 by the same or a different data structure process 110. If all cells of a part have been processed by data structure processes 110, the cursor 306 may be updated to indicate processing of the part has been completed, which may be indicated by having the cursor 306 point to a cell outside of the part 302 for which the cursor 306 is provided or setting the cursor to some predefined value indicating the part has been completely processed.

In the described embodiments, different data structure processes 110 may process at different times different cells in one part, and different processes may concurrently process cells in different parts of the data structure 104. Each process 110 uses the cursor 306 to determine the cell at which to begin processing in a part selected for processing. The process 110 may be programmed to process cells until a predetermined number of units of work have been located and added to a work list 112 or until a predetermined number of cells have been processed. After adding a predetermined number of units of work to a work list 112 or considering a predetermined number of cells, the process 110 may terminate processing that part.

In one embodiment, the data structure 108 comprises a bitmap of sequentially numbered consecutive cells. Although FIGS. 1 and 2 show the data structure 108 comprising a bitmap having a column of values, the bitmap may have multiple columns of cells to form an array. In one embodiment, each cell may have one of two values, such as one value indicating the work associated with the cell has not been processed and another value indicating the work has been processed. In further embodiments, each cell may have more than two possible values or have multiple values per cell to provide more detailed information, parameters and/or code on the work to be performed. In yet further embodiments, the data structure 108 may comprise structures other than bitmaps, such as entries in a database, entries in an object, etc.

In one embodiment, the cells of the data structure 108 may be used to indicate tracks or storage units that need to be copied from a source storage to a target storage. In such case, each cell may have a first value, e.g., zero, indicating that the data unit corresponding to the cell has been copied from the source to the target and a second value, e.g., one, indicating that the data unit has not yet been copied or transferred to the target location. In other embodiments, the cells may be associated with different types of work other than copying or transferring data, and each cell may correspond to a resource or other element upon which work may be performed. Further, each cell may include additional parameters to be used to indicate specific operations for the work to be performed to provide greater control of work execution.

Figure 4:
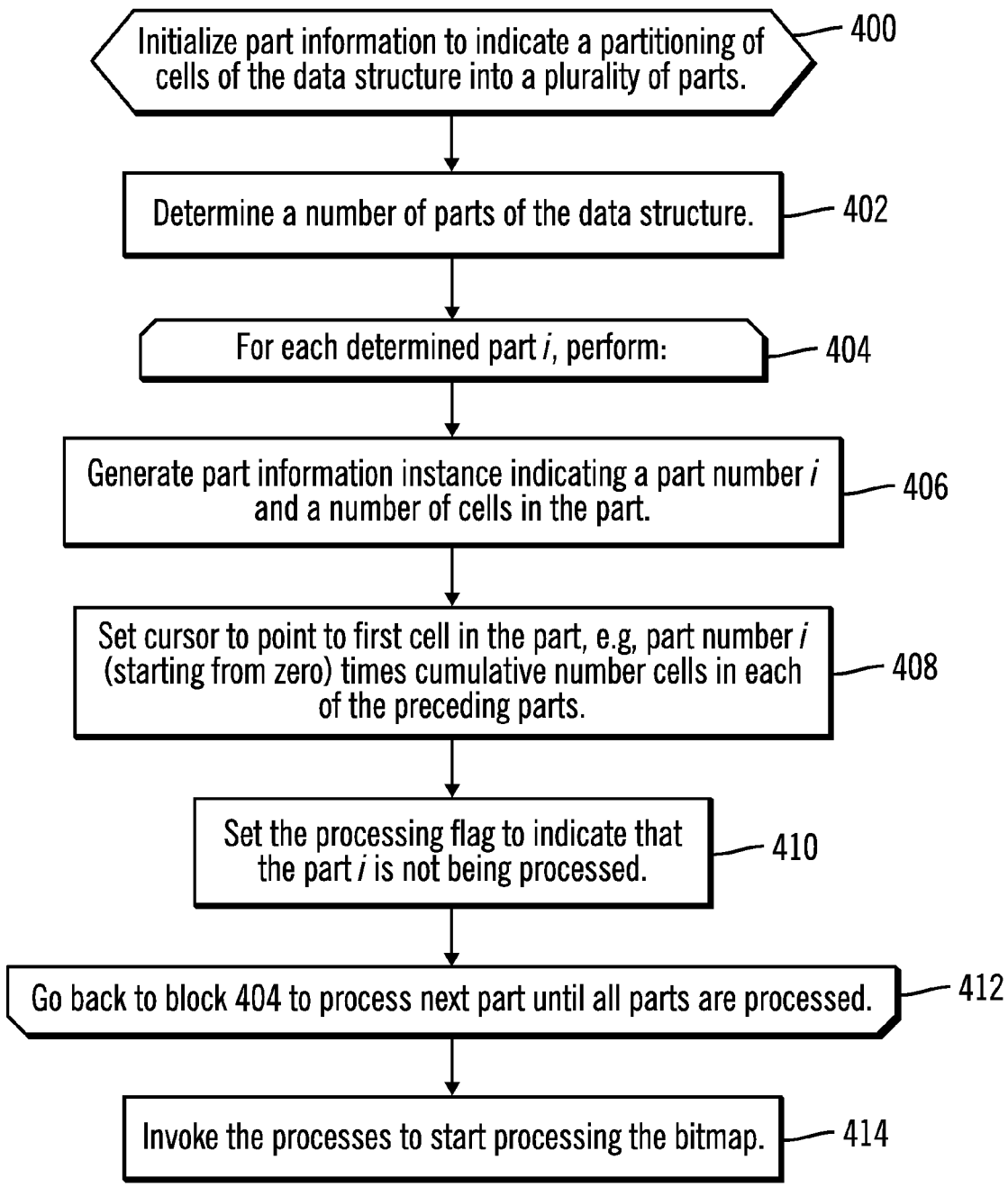
FIG. 4 illustrates an embodiment of operations to initialize the data structure and parts.

FIG. 4 illustrates an embodiment of operations performed by the process manager 106 to initialize the part information 300 to indicate a partitioning of cells of the data structure 108 into a plurality of parts of cells. Upon initiating (at block 400) the process to initialize the part information 300, the process manager 106 determines (at block 402) a number of parts of the data structure 108, e.g., a number of cells divided by a number of cells per part. The process manager 106 then performs a loop of operations at blocks 404 through 412 for each of the determined number of parts to define for the data structure 108. At block 406, the process manager 106 generates a part information instance $300_i$ for part i indicating a part number 302, e.g., i, and a number of cells 304 in the part 302, which may be the same for all parts. The cursor 306 is set (at block 408) to point to a first cell in the part, e.g., part number times number cells in a part. The processing flag 308 is set (at block 410) to indicate that the part is not being processed. After initializing the part information 300, the data structure processes 110 may be invoked (at block 414) to concurrently process different parts of the data structure 108.

Figure 5:
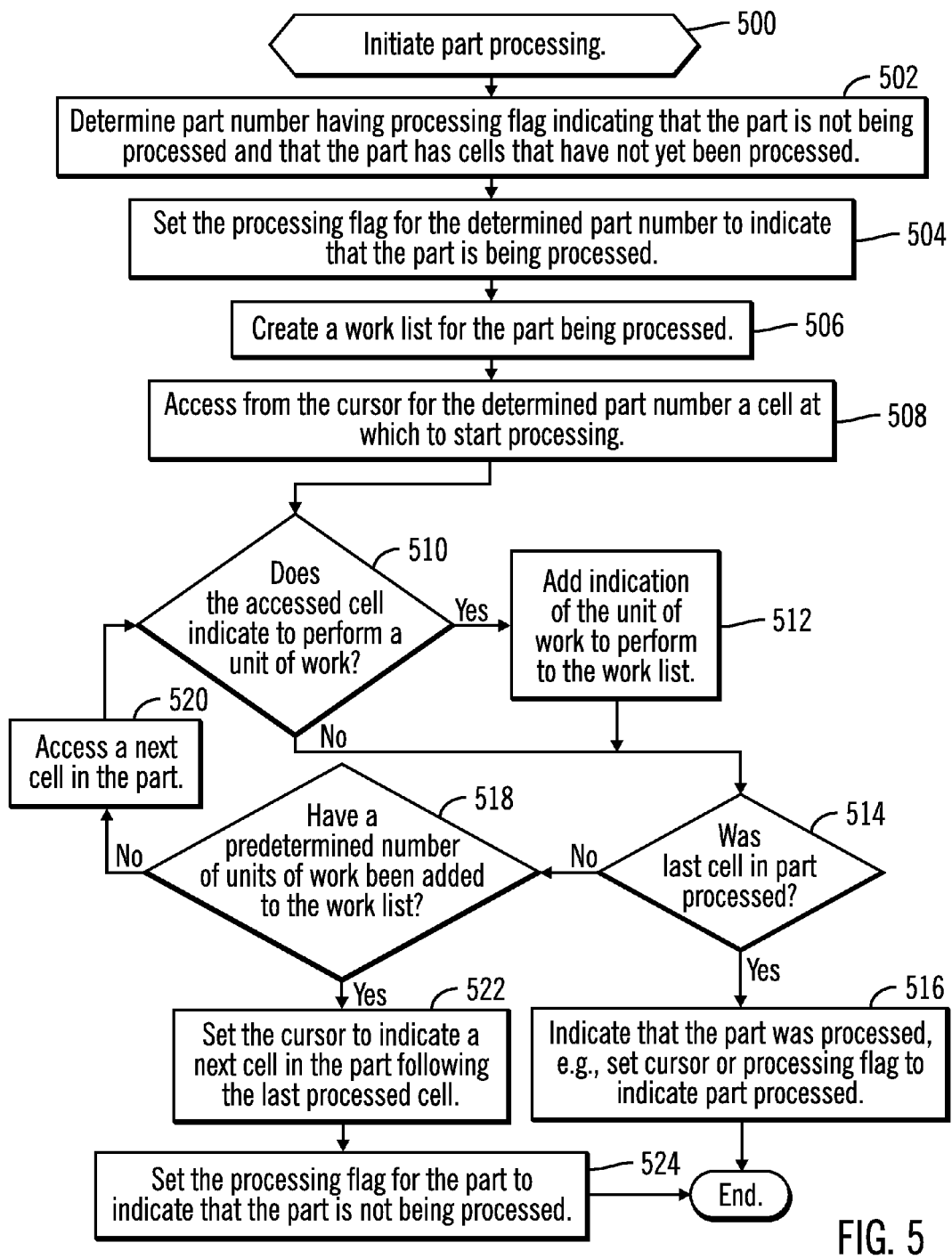
FIG. 5 illustrates an embodiment of operations for a process to select a part of cells.

FIG. 5 illustrates an embodiment of operations performed by each of the data structure processes 110 to process the data structure 108 to process units of works for cells in a part of the data structure 108. The data structure processes 110 may separately and concurrently execute the operations of FIG. 5 to concurrently process different parts of the data structure 108. Upon initiating (at block 500) data structure 108 processing, the process 110 determines (at block 502) a part number 302 or part having a processing flag 308 indicating that the part is not currently being processed and that the determined part has cells that have not yet been processed. The cursor 306, processing flag 308 or some other parameter may indicate that the part 302 does not have further cells to process, such as being set to a predefined value indicating such or pointing to a cell outside of the determined part 302. The process 110 sets (at block 504) the processing flag 308 for the determined part number 302 to indicate that the part 302 is being processed. The process 110 creates (at block 506) a work list 112 for the part being processed.

The process 110 then accesses (at block 508) using the cursor 306 a cell at which to start processing, such as addressed by the cursor 306. If (at block 510) the accessed cell indicates to perform a unit of work, then the process 110 adds (at block 512) the unit of work to the work list 112. When the work processes 114 later processes or perform the unit of work, the cell in the data structure 108 may be set to a value to indicate no work to process for the work corresponding to that cell. In an alternative embodiment, the cell may be set to indicate no work to process after adding indication of the unit of work to the work list. After adding indication of the work unit to the work list 112 (from block 512) or if (at block 510) the cell being processed has a value indicating no work to process, then if (a block 514) the last cell in the part was processed, the process 110 may indicate (at block 516) that the part was processed, such as by setting the cursor 306 to point to a cell outside of the part or have a predefined value indicating the part was processed or setting the processing flag 308 indicating the part was processed, and then control ends.

If (at block 514) the last cell was not processed, then a determination is made (at block 518) as to whether a predetermined number of units of work have been added to the work list 112. More cells than the predetermined number may need to be processed in the part before performing the predetermined number of units of work if there are cells that indicate that there is no work to process. If (at block 518) the predetermined number of units of work have not been added to the work list 112, then the process 110 accesses (at block 520) a next cell in the part and control proceeds back to block 510 to process the next cell.

In an alternative embodiment, the predetermined number may indicate a number of cells to process, regardless of whether the cells indicate work to perform work. In such case an embodiment, the operation at block 518 would check whether a predetermined number of cells have been processed from the part.

After performing the predetermined number of units of work from processing the cells (from the yes branch of block 518), the process 110 sets (at block 522) the cursor 306 for the part to indicate a next cell in the part following the last processed cell at which processing will continue during the next iteration of the operations of FIG. 5 by the same or a different process 110. In an alternative embodiment, the cursor 306 may identify the last processed cell, and the next process 110 processing that part would increment the cursor 306 to determine the cell at which to begin processing. In a further alternative embodiment, the cursor 306 may be incremented at block 520 when accessing a next cell in the part. The processing flag 308 for the part 302 is set (at block 524) to indicate that the part 302 is not being processed, and then control ends.

In an alternative embodiment, the process 110 may determine units of work to process by processing the part, and then after ending processing of the part perform the determined units of work.

With the described embodiments, processes may concurrently access the part information 300 to locate a part of the data structure 108 not being processed and then process the cells of that part, such as by adding to a work list 112 or performing the units of work. Further, after one process 110 completes processing a part and processing the predetermined number of units of work, another process may continue processing further cells in the part right where the last process left off in processing the part of the data structure 108.

The reference characters used herein, such as i and n, are used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
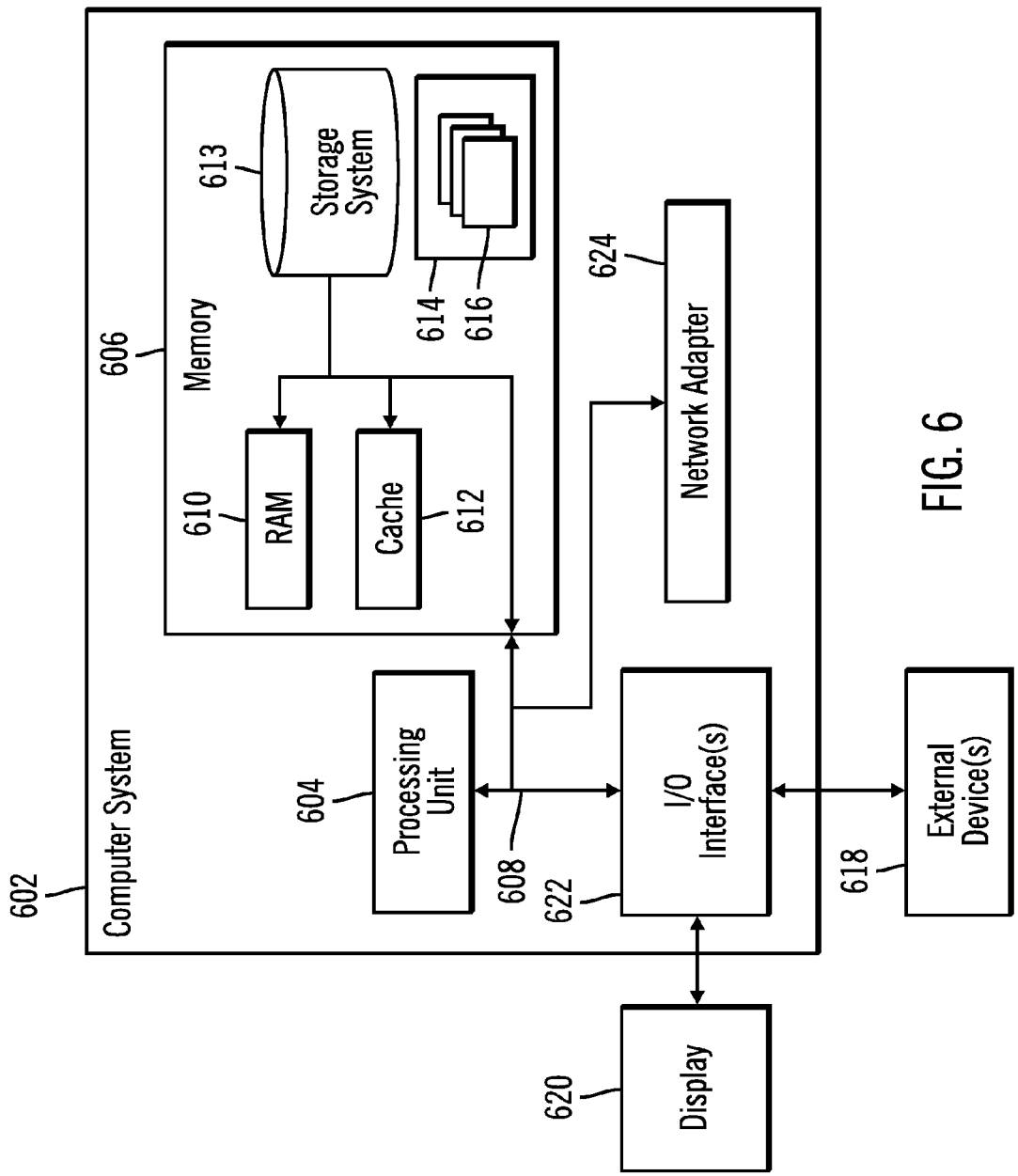
FIG. 6 illustrates a computing environment in which the components of FIG. 1 may be implemented.

The computational components of FIG. 1, including the computing system 100, may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing a data structure having a plurality of cells, wherein each cell represents a unit of work to process, wherein the computer program product comprises a computer readable storage medium having program instructions embodied therewith, the program instructions that when executed by a processor perform operations, the operations comprising:
   providing information to indicate a partitioning of the cells of the data structure into a plurality of parts, and having a cursor pointing to a cell in a part of the plurality of parts; and
   concurrently processing, by processes, different parts of the data structure by performing:
      determining, from the cursor for the part, one of the cells in the part to process;
      processing the cells from the cursor to determine whether to process the unit of work corresponding to the cell; and
      setting the cursor to identify one of the cells from which processing is to continue in a subsequent iteration in response to processing the units of work for a plurality of the processed cells.

2. The computer program product of claim 1, wherein the processing of the unit of work corresponding to the cell comprises adding indication of the unit of work corresponding to the cell to a work list, wherein the work list is processed to perform the unit of work indicated in the work list.

3. The computer program product of claim 1, wherein different processes process different cells of one of the parts, and wherein a subsequent process processing subsequent cells in one of the parts following a processing of previous cells uses the cursor to determine the subsequent cells to process.

4. The computer program product of claim 1, wherein the operations further comprise:
   for each of the parts, setting a processing flag to indicate that the part is not being processed;
   setting, by one of the processes processing one of the parts, the processing flag to indicate that the part is being processed; and
   setting, by one of the processes completing processing of the cells in one of the parts being processed, the processing flag to indicate that the part is not being processed.

5. The computer program product of claim 4, wherein the operations further comprise:
   determining, by one of the processes, the processing flag for one of the parts indicating that the part is not being processed, wherein the process sets the processing flag to indicate that the part is being processed in response to determining that the processing flag for the part indicates that the part is not being processed.

6. The computer program product of claim 1, wherein the data structure comprises a bitmap, wherein each cell of the bitmap has one of a first value indicating to perform the unit of work represented by the cell and a second value indicating that there is no work to be performed for the cell, wherein the determining whether to perform the unit of work represented by the cell comprises determining whether the cell has the first value, wherein the operations further comprise:
   setting the cell to the second value in response to processing the unit of work represented by the cell when the cell has the first value; and
   processing a next cell in the part to determine whether the next cell has the first or second value in response to setting the cell to the second value or determining that a previously processed cell has the second value.

7. The computer program product of claim 1, wherein the operations further comprise:

setting, by the process, the cursor to indicate that the part has been processed in response to processing a last cell in the part.

8. The computer program product of claim 1, wherein the cells in each part are in a sequential ordering, wherein each of the parts comprise consecutively ordered cells according to the sequential ordering, and wherein the parts are processed in an order so as to process the cells in the data structure according to the sequential ordering.

9. A system for processing a data structure having a plurality of cells, wherein each cell represents a unit of work to process, comprising:
a processor; and
a computer readable storage medium having program instructions that when executed by the processor perform operations, the operations comprising:
providing information to indicate a partitioning of the cells of the data structure into a plurality of parts, and having a cursor pointing to a cell in a part of the plurality of parts; and
concurrently processing, by processes, different parts of the data structure by performing:
determining, from the cursor for the part, one of the cells in the part to process;
processing the cells from the cursor to determine whether to process the unit of work corresponding to the cell; and
setting the cursor to identify one of the cells from which processing is to continue in a subsequent iteration in response to processing the units of work for a plurality of the processed cells.

10. The system of claim 9, wherein the processing of the unit of work corresponding to the cell comprises adding indication of the unit of work corresponding to the cell to a work list, wherein the work list is processed to perform the unit of work indicated in the work list.

11. The system of claim 9, wherein different processes process different cells of one of the parts, and wherein a subsequent process processing subsequent cells in one of the parts following a processing of previous cells uses the cursor to determine the subsequent cells to process.

12. The system of claim 9, wherein the operations further comprise:
for each of the parts, setting a processing flag to indicate that the part is not being processed;
setting, by one of the processes processing one of the parts, the processing flag to indicate that the part is being processed; and
setting, by one of the processes completing processing of the cells in one of the parts being processed, the processing flag to indicate that the part is not being processed.

13. The system of claim 12, wherein the operations further comprise:
determining, by one of the processes, the processing flag for one of the parts indicating that the part is not being processed, wherein the process sets the processing flag to indicate that the part is being processed in response to determining that the processing flag for the part indicates that the part is not being processed.

14. The system of claim 9, wherein the cells in each part are in a sequential ordering, wherein each of the parts comprise consecutively ordered cells according to the sequential ordering, and wherein the parts are processed in an order so as to process the cells in the data structure according to the sequential ordering.

15. A method for processing a data structure having a plurality of cells, wherein each cell represents a unit of work to process, comprising:
providing information to indicate a partitioning of the cells of the data structure into a plurality of parts, and having a cursor pointing to a cell in a part of the plurality of parts; and
concurrently processing, by processes, different parts of the data structure by performing:
determining, from the cursor for the part, one of the cells in the part to process;
processing the cells from the cursor to determine whether to process the unit of work corresponding to the cell; and
setting the cursor to identify one of the cells from which processing is to continue in a subsequent iteration in response to processing the units of work for a plurality of the processed cells.

16. The method of claim 15, wherein the processing of the unit of work corresponding to the cell comprises adding indication of the unit of work corresponding to the cell to a work list, wherein the work list is processed to perform the unit of work indicated in the work list.

17. The method of claim 15, wherein different processes process different cells of one of the parts, and wherein a subsequent process processing subsequent cells in one of the parts following a processing of previous cells uses the cursor to determine the subsequent cells to process.

18. The method of claim 15, further comprising:
for each of the parts, setting a processing flag to indicate that the part is not being processed;
setting, by one of the processes processing one of the parts, the processing flag to indicate that the part is being processed; and
setting, by one of the processes completing processing of the cells in one of the parts being processed, the processing flag to indicate that the part is not being processed.

19. The method of claim 18, further comprising:
determining, by one of the processes, the processing flag for one of the parts indicating that the part is not being processed, wherein the process sets the processing flag to indicate that the part is being processed in response to determining that the processing flag for the part indicates that the part is not being processed.

20. The method of claim 15, wherein the cells in each part are in a sequential ordering, wherein each of the parts comprise consecutively ordered cells according to the sequential ordering, and wherein the parts are processed in an order so as to process the cells in the data structure according to the sequential ordering.

* * * * *